Jan. 10, 1933.  O. BIELER  1,893,928
COUNTERBALANCE FOR DRIVE SHAFTS
Filed Aug. 20, 1929
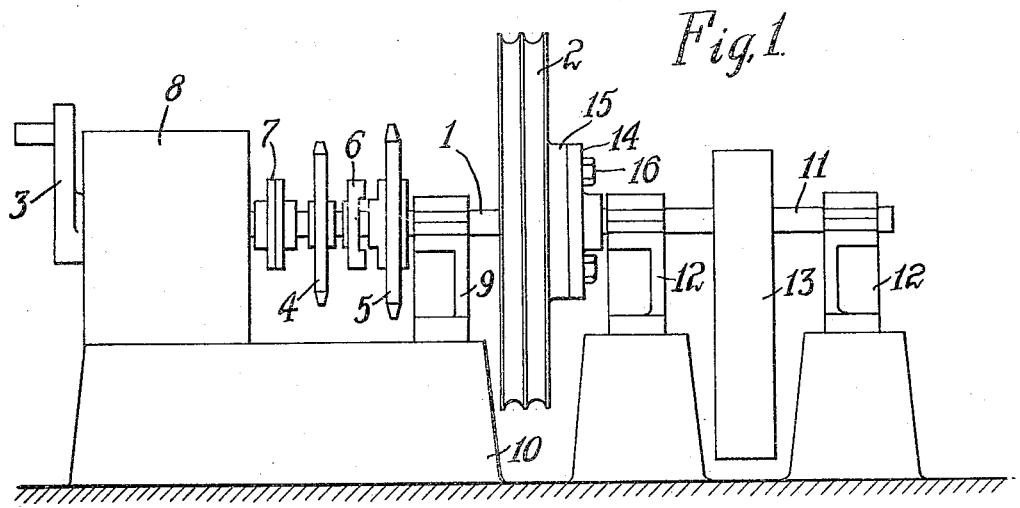
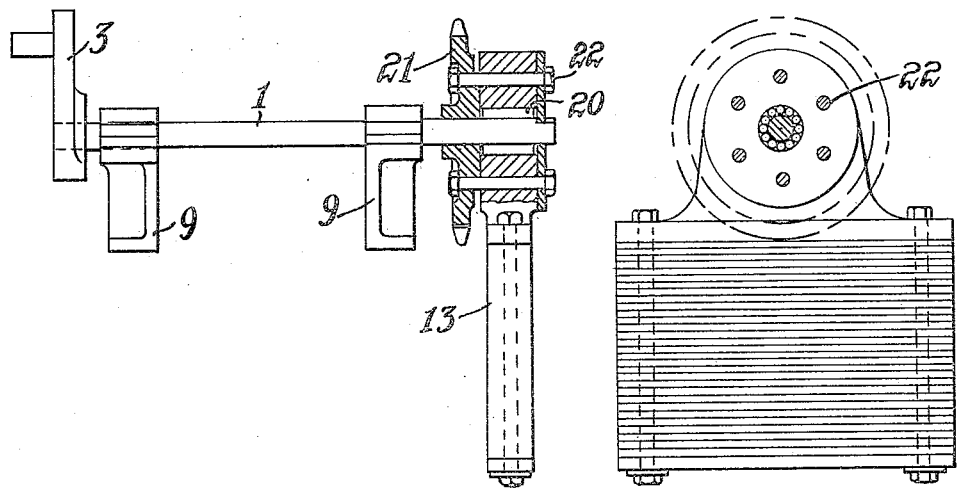
INVENTOR
Oscar Bieler
by William B. Jaspert,
Attorney.

Patented Jan. 10, 1933

1,893,928

UNITED STATES PATENT OFFICE

OSCAR BIELER, OF PITTSBURGH, PENNSYLVANIA

COUNTERBALANCE FOR DRIVE SHAFTS

Application filed August 20, 1929. Serial No. 387,138.

This invention relates to drive mechanism for oil well drilling and pumping equipment and more particularly to means for counterbalancing the drive shaft for certain operations such as pumping. Such mechanism embodies a driven shaft provided with a crank at one end which is connected by a pitman to the walking beam and the drive shaft is further provided with sprocket connections and pulleys and suitable clutches for rendering them severally or simultaneously operative for the different uses to which they may be put.

For the drilling and pulling operations the ordinary drive mechanism is adequately efficient in its function of transmitting power from the walking beam to the drill or hoisting line, but when the equipment is utilized for pumping it is inadequate for the reason that the weight of the sucker rod which is usually of great length, causes an unbalanced condition of the drive mechanism which subjects it to severe strain and requires undue power in its operation.

To provide for the balancing of the drive mechanism during pumping operations and to render the equipment readily changeable to drilling and pulling operations, I provide a novel means for counterbalancing the driven shaft whereby the counterbalanced weight may be employed without requiring any particular attachment or adjustment such as has been heretofore employed.

It is among the objects of this invention to provide a drive mechanism with a counter balance means which is at all times in cooperation or working alinement with the driven shaft and which is further readily attachable or detachable to render it operative as a balance when desired.

In the accompanying drawing constituting a part hereof and in which like reference characters designate like parts, Fig. 1 is a side elevational view of a drive mechanism for oil well rigs embodying the principles of this invention; Fig. 2 is an elevational view partly in section of a modified form of counter balance mechanism of which Fig. 3 is an end elevational view.

With reference to Fig. 1 of the drawing, the structure therein illustrated comprises a driven shaft 1 having a tug wheel 2 secured thereon to be rotatable therewith and being provided with a crank 3 that is attachable by a pitman to a walking beam.

Mounted on shaft 1 are the usual sprocket wheels 4 and 5 having clutch mechanism 6 for disconnecting them or engaging them with the shaft 1 and which may be provided with a coupling 7 for convenience of assembly to the driven shaft. The shaft 1 is journalled in the case 8 and pillow block bearing 9 which are mounted on a concrete base 10.

A shaft 11 journalled in bearings 12 is disposed in coaxial alinement with the shaft 1 and carries a counterbalance weight 13 which rotates therewith. A flanged coupling 14 is secured to the end of shaft 11 and is adapted to be fastened to the hub 15 of the tug wheel 2 or to a flange coupling on shaft 1 to which it may be secured by cap bolts 16. In the mechanism shown, the counter balance may be readily connected to or disconnected from shaft 1 to constitute it a counter balance on the drive mechanism, it being necessary to merely fasten the bolts 16 after the coupling of shaft 11 has been properly alined with the screw holes of the tug wheel 2. By this manner of associating the counterbalance weight with the drive mechanism, the handling of parts of the counterweight as heretofore employed, is entirely eliminated and the counterweight may be connected to or disconnected from the drive mechanism in a simple and expedient manner. Furthermore, by permanently mounting the counterbalance on a solid foundation, its proper alinement and operativeness is always assured.

With reference to Fig. 2 of the drawing, the counterbalance is shown journalled on roller bearings 20 at the end of the drive shaft 1, thus rendering it independently rotatable when it has no other connection with the drive shaft.

In this construction which eliminates the use of a separate shaft and bearing members, the counterbalance may be secured to a sprocket wheel 21 which is keyed or otherwise secured to rotate with the drive shaft 1. The manner of fastening the counterbalance may most conveniently be accomplished by through bolts 22 which pass through the hub section of the sprocket gear and the solid portion of the counterbalance so that when the bolts are fastened the counterbalance weight rotates with shaft 1 by virtue of its connection with the sprocket wheel 21.

In the modification illustrated in Figs. 2 and 3, the counterbalance weight remains stationary when it is disconnected from the sprocket wheel 21, since it has no other connections with the drive shaft and is freely journalled by the anti-friction rollers 20.

In the operation of the device the counterbalance 13 is disconnected from the drive mechanism, namely, the tug wheel 2 and sprocket wheel 21 of Figs. 1 and 2 respectively, when the drive mechanism is utilized for drilling and pulling operations, and they are employed as a feature of the drive when the mechanism is utilized for pumping operations, by simply fastening the bolts 16 or 22 with their cooperating members.

When the counterbalances are employed, they are secured in a manner to offset the weight of the sucker rod so that they counter-act the action of gravity on the down stroke of the rod and assist in lifting the weight of the rod on the upstroke of the drive, thereby smoothing out the drive and effecting a reduction in the power required for the pumping operation.

It is evident from the foregoing description of this invention that counterbalances for oil well drive mechanisms designed and applied in the manner herein illustrated and described provide simple and expedient means for connecting and disconnecting the counterbalance with the drive shaft.

It will be obvious to those skilled in the art that various modifications may be made in the details of construction without departing from the principles herein set forth.

I claim:

Mechanism for oil well drilling and pumping operations comprising a plurality of axially aligned shafts independently journalled for a rotation, a drive connection on one of said shafts, a counter balance on the other of said shafts and means for detachably connecting the counterbalance shaft to said drive connection.

In testimony whereof I have hereunto set my hand and seal this 12th day of August, 1929, at Pittsburgh, Pa.

OSCAR BIELER.